US012732097B2

(12) United States Patent
Sakamoto et al.

(10) Patent No.: US 12,732,097 B2
(45) Date of Patent: Sep. 8, 2026

(54) CONTROL DEVICE, SYSTEM AND STORAGE MEDIUM

(71) Applicant: KABUSHIKI KAISHA TOSHIBA, Tokyo (JP)

(72) Inventors: Takafumi Sakamoto, Tokyo (JP); Hidenori Okuni, Yokohama (JP); Masaki Nishikawa, Yokohama (JP); Kentaro Taniguchi, Kawasaki (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 231 days.

(21) Appl. No.: 18/762,874

(22) Filed: Jul. 3, 2024

(65) Prior Publication Data

US 2025/0088098 A1 Mar. 13, 2025

(30) Foreign Application Priority Data

Sep. 12, 2023 (JP) ................................ 2023-147536

(51) Int. Cl.
*H02M 1/44* (2007.01)
*H02M 1/00* (2006.01)
*H02M 1/12* (2006.01)

(52) U.S. Cl.
CPC ........... *H02M 1/44* (2013.01); *H02M 1/0038* (2021.05); *H02M 1/0043* (2021.05); *H02M 1/12* (2013.01)

(58) Field of Classification Search
CPC .... H02M 1/0038; H02M 1/0043; H02M 1/12; H02M 1/44
See application file for complete search history.

(56) References Cited

U.S. PATENT DOCUMENTS 5,917,721 A * 6/1999 Kerkman .......... H02M 7/53875 363/41
9,293,921 B2 3/2016 Jones et al.
(Continued)

FOREIGN PATENT DOCUMENTS

CN 110581640 B 6/2021
JP 5047829 B2 10/2012
(Continued)

OTHER PUBLICATIONS

Kawakami, “22. DC-AC Inverter (6)”, 2017, pp. 1-12, https://www2kawakami.ct.osakafuu.ac.jp/omucontent/uploads/sites/1161/Lecture_Data/Power_Electronics/01_Lecture/22_lecture_power_electronics.pdf.

(Continued)

*Primary Examiner* — Lakaisha Jackson
(74) *Attorney, Agent, or Firm* — Holtz, Holtz & Volek PC

(57) ABSTRACT

According to one embodiment, a control device is connected to a first switching controller and a second switching controller. The control device includes a transmitter/receiver configured to communicate with the first switching controller and the second switching controller, and a timing controller configured to control operation time points of the first switching controller and the second switching controller, based on a first distance corresponding to a distance between a target point corresponding to a point where electromagnetic noise emitted from the first switching controller and the second switching controller is suppressed and the first switching controller, and a second distance corresponding to a distance between the target point and the second switching controller.

12 Claims, 9 Drawing Sheets

(56) References Cited

U.S. PATENT DOCUMENTS 10,263,536 B2 * 4/2019 Nikolov ................ H02M 7/003
2012/0235614 A1 * 9/2012 Tallam ................ H02M 5/4585 318/400.27
2015/0028851 A1 1/2015 Ohori et al.
2016/0187802 A1 6/2016 Kagawa
2017/0144567 A1 5/2017 Takagi
2024/0072793 A1 2/2024 Okuni et al.

FOREIGN PATENT DOCUMENTS

JP 2016122150 A 7/2016
JP 6204113 B2 9/2017
JP 2019165520 A 9/2019
JP 2020058164 A 4/2020
JP 2024034518 A 3/2024

OTHER PUBLICATIONS

Miyamoto, et al., "The role of the power conditioner (PCS) in a solar power generation system, MPPT control algorithms, and environmental performance", 2021, 7 pages, https://www.hitachihightech.com/jp/ja/products/manufacturingrelated/lithium-battery-solutions/solarenergy-use/power-conditioner.html.

Japanese Decision to Grant a Patent (and an English language translation thereof) dated Jan. 6, 2026, issued in corresponding Japanese Application No. 2023-147536.

Extended European Search Report (EESR) dated Jan. 7, 2025, issued in counterpart European Application No. 24186499.0.

* cited by examiner

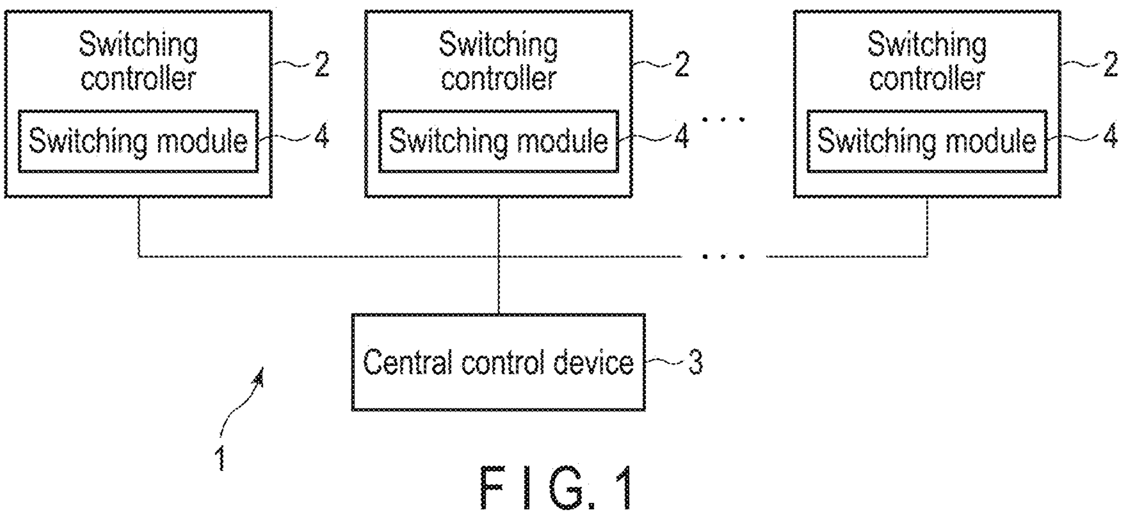
F I G. 1
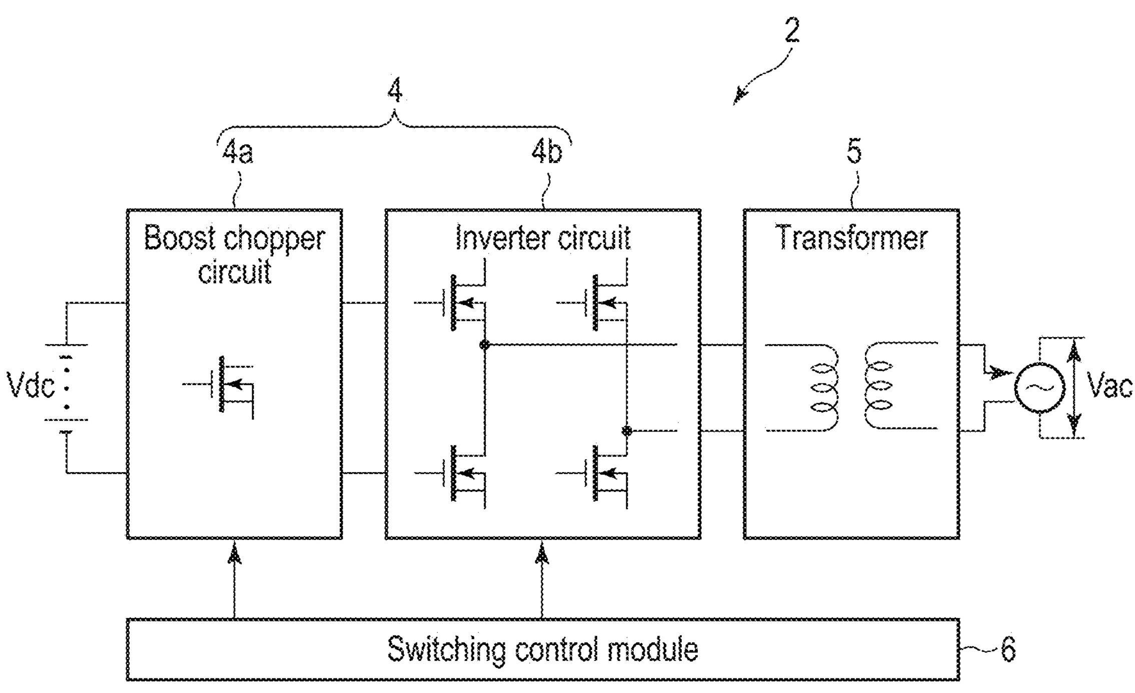
F I G. 2

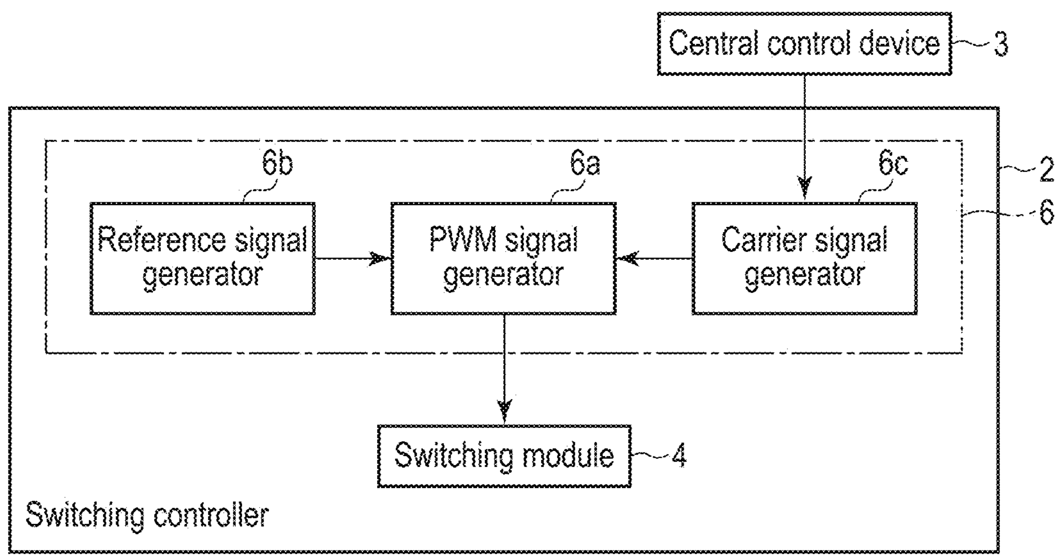
F I G. 3
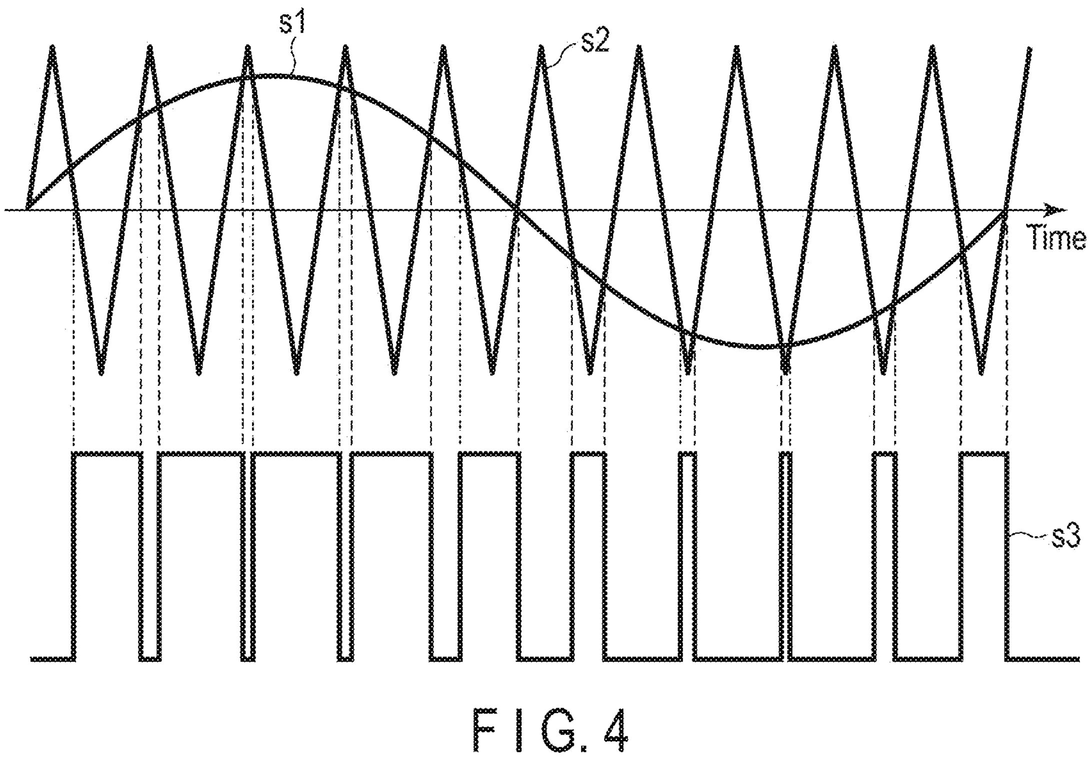
F I G. 4

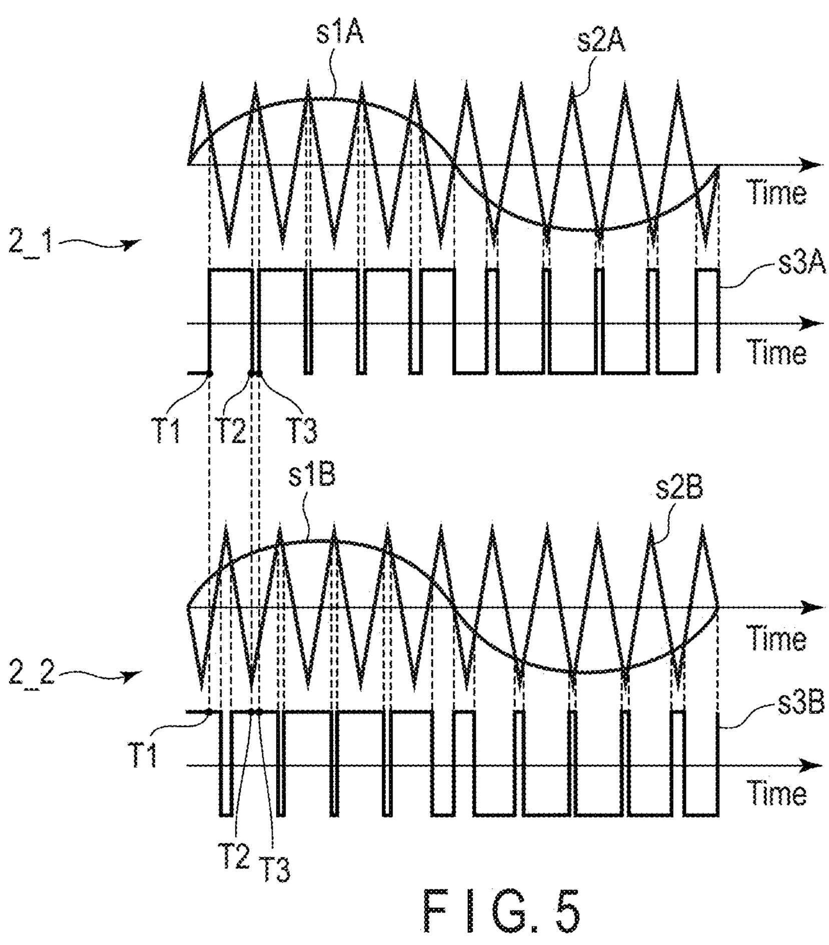
F I G. 5
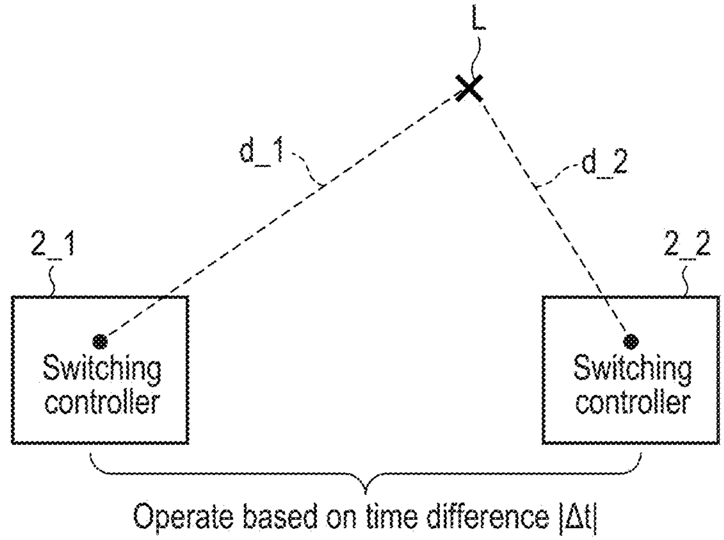
F I G. 6

CONTROL DEVICE, SYSTEM AND STORAGE MEDIUM

CROSS-REFERENCE TO RELATED APPLICATIONS

This application is based upon and claims the benefit of priority from Japanese Patent Application No. 2023-147536, filed Sep. 12, 2023, the entire contents of which are incorporated herein by reference.

FIELD

Embodiments described herein relate generally to a control device, a system and a storage medium.

BACKGROUND

In recent years, power generation methods using renewable energy such as photovoltaic power generation and wind power generation, have become increasingly prevalent. In accordance with this trend, a large number of power conditioners (PCS: power conditioning subsystems) including inverter circuits to convert DC voltage generated using renewable energy into AC voltage, have been installed within a certain range.

By the way, the inverter circuits in the above-mentioned PCS generate electromagnetic noise due to switching operations. When a number of such inverter circuits are installed within a certain range, a phenomenon that electromagnetic noise generated by each inverter circuit interferes with each other and intensifies each other may occur. For this reason, realizing a new technology that can suppress the increase in electromagnetic noise observed due to this phenomenon is desired.

BRIEF DESCRIPTION OF THE DRAWINGS

FIG. 1 is a diagram showing a schematic configuration example of a switching system according to a first embodiment.

FIG. 2 is a diagram showing a detailed configuration of a switching controller according to the embodiment.

FIG. 3 is a diagram showing a detailed configuration of the switching control unit included in the switching controller according to the embodiment.

FIG. 4 is a chart illustrating a process of generating PWM signals, which is performed by a PWM signal generator shown in FIG. 3.

FIG. 5 is a chart illustrating control of an operation time point of the switching controller, which is performed by the central control device according to the embodiment.

FIG. 6 is a diagram illustrating a case where the noise enhancement effect occurs.

DETAILED DESCRIPTION

Figure 7:
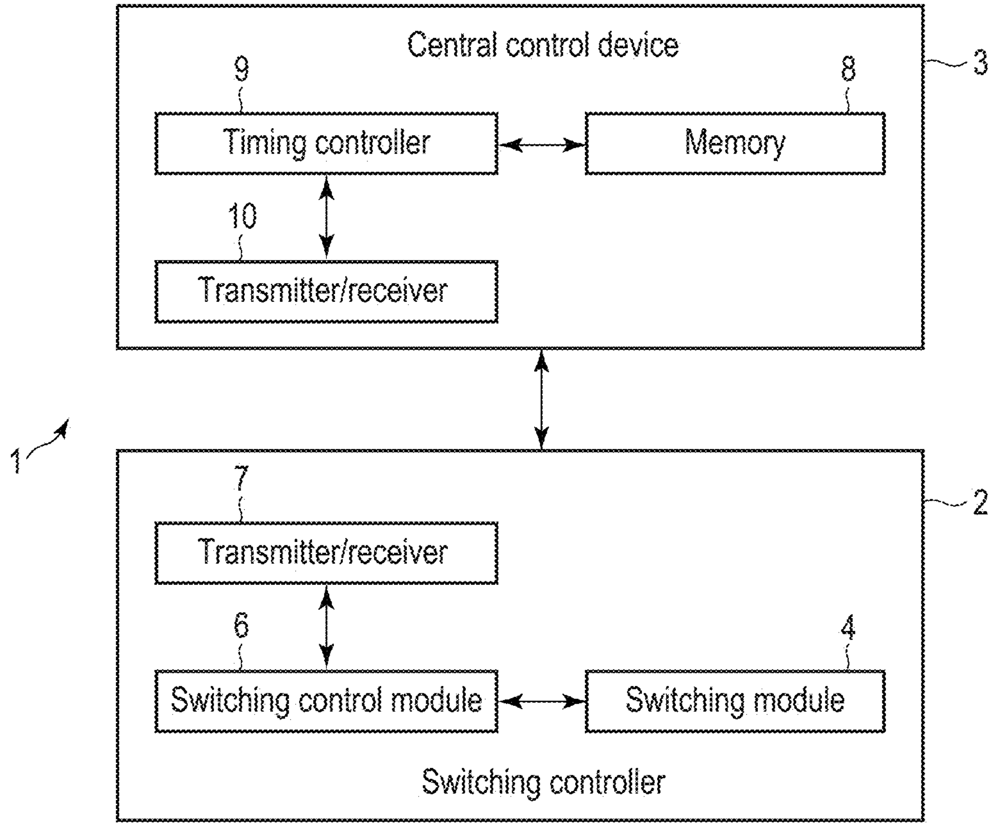
FIG. 7 is a diagram showing a detailed configuration of the central control device according to the embodiment.

In general, according to one embodiment, a control device is connected to a first switching controller and a second switching controller converting AC signals into DC signals and outputting the DC signals or converting DC signals into AC signals and outputting the AC signals. The control device includes a transmitter/receiver configured to communicate with the first switching controller and the second switching controller, and a timing controller configured to control operation time points of the first switching controller and the second switching controller, based on a first distance corresponding to a distance between a target point corresponding to a point where electromagnetic noise emitted from the first switching controller and the second switching controller is suppressed and the first switching controller, and a second distance corresponding to a distance between the target point and the second switching controller.

Embodiments will be described hereinafter with reference to the accompanying drawings.

The disclosure is merely an example and the invention is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

First Embodiment

FIG. 1 is a diagram showing a schematic configuration example of a switching system 1 according to the present embodiment. As shown in FIG. 1, the switching system 1 comprises a plurality of switching controllers 2 and a central control device 3. The central control device 3 may be simply referred to as a control device. Incidentally, the number of switching controllers 2 included in the switching system 1 may be any number as long as the number is at least two or more.

Each of the plurality of switching controllers 2 comprises a switching module 4 and performs switching control to turn on and off the switching module 4 in its own device at predetermined timing.

Each of the switching controllers 2 is, for example, a power conversion device that converts DC voltage generated by a renewable energy power generation device, such as a photovoltaic (PV) device, into AC voltage. This type of power conversion device is also referred to as a power conditioner (PCS: power conditioning subsystem). Incidentally, the power conversion device may have a mode of converting DC voltage to AC voltage (in other words, a mode of converting DC signals to AC signals) and a mode of converting AC voltage to DC voltage (in other words, a mode of converting AC signals to DC signals).

The central control device 3 is connected to the plurality of switching controllers 2 to control the operations of the plurality of switching controllers 2. More specifically, the central control device 3 generates control parameters on timing at which the switching controller 2 performs a switching operation, for each switching controller 2, and supplies (notifies) the parameters to the switching controller 2. Incidentally, the control parameters may be referred to as control information.

For example, the central control device 3 generates a first control parameter on the timing at which one of the plurality of switching controllers 2 performs the switching operation and supplies a second control parameter on the timing at which another one of the plurality of switching controllers 2 performs the switching operation. The central control device 3 supplies the first control parameter to one of the plurality of switching controllers 2 described above and supplies the second control parameter to another one of the plurality of switching controllers 2 described above.

One of the plurality of switching controllers 2 described above performs switching control of the switching module 4 in its own device, based on the first control parameter supplied from the central control device 3. Similarly, another one of the plurality of switching controllers 2 described above performs switching control of the switching module 4 in its own device, based on the second control parameter supplied from the central control device 3.

By the way, the switching controller 2 shown in FIG. 1 performs the switching operation, and can be thereby a noise source which generates electromagnetic noise. A value of electromagnetic noise generated from one switching controller 2 in accordance with the switching operation of the switching controller 2 and then observed is assumed to be "1", and a situation that N switching controllers 2 are arranged in close proximity to each other is also assumed.

In such a situation, for example, when the electromagnetic noise generated from each of the N switching controllers 2 is uncorrelated, each of the values of the electromagnetic noise generated from and observed by the respective switching controllers 2 remains "1".

In contrast, in the above-described situation, when the timing of performing the switching operations by the N switching controllers 2 coincides, the electromagnetic noise generated by each of the switching controllers 2 remains unchanged, but each of the values of the electromagnetic noise generated by the respective switching controllers 2 and then observed is emphasized to "N times", depending on the position where the electromagnetic noise is observed. In addition, when not only the timing at which the N switching controllers 2 perform the switching operations, but the waveform shapes (frequency characteristics) of the electromagnetic noise generated from the respective switching controllers 2 further match, each of the values of the electromagnetic noise generated from the respective switching controllers 2 and then observed is emphasized to "N×N times", depending on the position where the electromagnetic noise is observed.

Thus, in a situation in which a plurality of noise sources are arranged in close proximity, the electromagnetic noise generated from each of the plurality of noise sources may interfere with each other and intensify each other. In this case, such a phenomenon is referred to as a "noise enhancement effect".

Therefore, the central control device 3 according to the present embodiment controls the operation of each switching controller 2 so as to suppress the electromagnetic noise generated from each of the plurality of switching controllers 2 from increasing due to the above-described noise enhancement effect and then being observed. More specifically, the central control device 3 generates control parameters different from each other, for the plurality of switching controllers 2 which are control targets, respectively, and supplies the control parameters to the switching controllers 2. Incidentally, the plurality of switching controllers 2 that are control targets may be all the switching controllers 2 connected to the central control device 3 or may be the plurality of switching controllers 2 that may cause the noise enhancement effect to occur.

FIG. 2 is a diagram showing a detailed configuration of the switching controller 2 according to the present embodiment. Each of the plurality of switching controllers 2 shown in FIG. 1 has the same configuration.

As shown in FIG. 2, the switching controller 2 comprises a switching module 4, a transformer 5, and a switching control module 6.

The switching module 4 includes one or more switching elements and includes, for example, a boost chopper circuit 4*a* and an inverter circuit 4*b*. The boost chopper circuit 4*a* converts the voltage amplitude of the input DC voltage. The inverter circuit 4*b* generates AC voltage by switching turning on and off the switching element in the own circuit, based on a pulse width modulation (PWM) signal generated using a carrier signal and a reference signal, which will be described below. Incidentally, the elements included in the switching module 4 are not limited to the boost chopper circuit 4*a* and the inverter circuit 4*b* described above, but may include other elements that perform conversion of DC/AC, and conversion of voltage, current, frequency, number of phases, and the like, for example, in a state of suppressing the power loss. More specifically, the switching module 4 may include a converter circuit.

The transformer 5 converts the voltage amplitude of the AC voltage to generate, for example, a commercial power supply voltage of 100 V.

The switching control module 6 performs switching control to turn on and off the switching module 4 at predetermined timing. In other words, the switching control module 6 controls the operations of the boost chopper circuit 4*a* and the inverter circuit 4*b* included in the switching module 4.

The switching control module 6 may be a semiconductor chip which performs digital signal processing, such as a central processing unit (CPU) or a digital signal processor (DSP), or a discrete digital circuit component, or may be a semiconductor chip which performs analog signal processing, or a discrete analog circuit component.

FIG. 3 is a diagram showing a detailed configuration of the switching control module 6 included in the switching controller 2 according to the present embodiment. As shown in FIG. 3, the switching control module 6 includes a PWM signal generator 6*a*, a reference signal generator 6*b*, and a carrier signal generator 6*c*.

The PWM signal generator 6*a* generates PWM signals to control turning on/off the switching module 4. Although described below in detail, the PWM signal generator 6*a* generates PWM signals by comparing the magnitude in reference signals generated by the reference signal generator 6*b* and the magnitude in carrier signals generated by the carrier signal generator 6*c*.

The reference signal generator 6*b* generates compensation values to make the AC voltage output from the switching module 4 correspond to a target value and generates the reference signals, based on the compensation values. The generated reference signals are transmitted to the PWM signal generator 6*a*.

The carrier signal generator 6*c* generates the carrier signals, based on the control parameters supplied from the central control device 3. More specifically, the carrier signal generator 6*c* generates the carrier signals having at least one of the frequency or phase indicated by the control parameters supplied from the central control device 3. The generated carrier signals are transmitted to the PWM signal generator 6*a*.

Incidentally, in the present embodiment, the control parameters supplied from the central control device 3 may indicate phases of the carrier signals at a reference time or may indicate the time when the phases of the carrier signals become zero. In addition, the control parameters supplied from the central control device 3 may include signals obtained by modulating carrier frequencies, which are frequencies of the carrier signals. Incidentally, the control parameters may further indicate, for example, waveform shapes, signal amplitudes and the like of the carrier signals, in addition to the values on the above-described phases and carrier frequencies.

In addition, in the present embodiment, it is assumed that the carrier signals generated by the carrier signal generator 6*c* is triangular wave signals, but the carrier signals generated by the carrier signal generator 6*c* may have any waveform shape of, for example, a saw wave signal, a sine wave signal, a square wave signal, or the like.

FIG. 4 is a chart illustrating a process of generating the PWM signal, which is performed by the PWM signal generator 6*a* shown in FIG. 3.

A reference signal s1 generated by the reference signal generator 6*b* has a frequency similar to the frequency (e.g., 50 Hz to 60 Hz) of the AC voltage output from the switching module 4. In addition, a carrier signal s2 generated by the carrier signal generator 6*c* is a signal having a frequency much higher than the reference signal s1 and is, for example, a triangular wave signal as described above.

For example, the PWM signal generator 6*a* sets the PWM signal to a high level when a signal amplitude of the reference signal s1 is larger than that of the carrier signal s2, and sets the PWM signal to a low level when the signal amplitude of the reference signal s1 is smaller than or equal to that of the carrier signal s2. According to this, a PWM signal s3 having a pulse width which varies as shown in FIG. 4 is generated. The generated PWM signal s3 is transmitted to the switching module 4.

The switching module 4 performs a switching operation to switch turning on/off one or more switching elements included in the switching module 4, based on the PWM signal s3 from the PWM signal generator 6*a*.

The central control device 3 can control the pulse width of the PWM signal s3 by controlling at least one of the frequency or the phase of the carrier signal s2. The central control device 3 according to the present embodiment controls the timing of emitting the electromagnetic noise from a plurality of switching controllers 2 by controlling the phase of the carrier signal s2 and controlling the pulse width of the PWM signal s3.

FIG. 5 is a chart illustrating a case of controlling the timing of emitting the electromagnetic noise from two switching controllers 2_1 and 2_2 by controlling phases of carrier signals s2A and s2B of two switching controllers 2_1 and 2_2 and controlling pulse widths of PWM signals s3A and s3B. As shown in FIG. 5, the phase of the carrier signal s2A of the switching controller 2_1 and the phase of the carrier signal s2B of the switching controller 2_2 are controlled to be shifted by π (180 degrees) from each other by control parameters supplied by the central control device 3. According to this, as shown in FIG. 5, the switching controller 2_2 can be prevented from performing the switching operation at timing T1, T2, T3, . . . when the switching controller 2_1 performs the switching operation. In other words, the timing at which the electromagnetic noise is emitted from the two switching controllers 2_1 and 2_2 can be shifted.

However, it is impossible to respond to the case shown in FIG. 6 by simply setting the timing at which the electromagnetic noise is emitted from a plurality of switching controllers 2 to different timing.

FIG. 6 shows a case in which two switching controllers 2_1 and 2_2 operate with a time difference $|\Delta t|$ (i.e., generate the carrier signals with a time difference $|\Delta t|$) and the electromagnetic noise is emitted from two switching controllers 2_1 and 2_2 with a time difference $|\Delta t|$. Incidentally, in FIG. 6, a distance from the switching controller 2_1 to a predetermined point L is referred to as d_1, a distance from the switching controller 2_2 to the predetermined point L is referred to as d_2, and a case in which the switching controller 2_2 operates after a time equivalent to $|\Delta t|$ after the switching controller 2_1 operates is assumed.

When it is assumed that a propagation speed of the electromagnetic noise emitted from each of the switching controllers 2_1 and 2_2 is referred to as c (constant value), the electromagnetic noise emitted from the switching controller 2_1 reaches the point L after a time t_1 (=d_1/*c*) after the electromagnetic noise is emitted. In contrast, the electromagnetic noise emitted from the switching controller 2_2 reaches the point L after time t_2 (=d_2/*c*) after the electromagnetic noise is emitted.

At this time, if a relationship t_1=t_2+$|\Delta t|$ is established between the above-described times t_1 and t_2 and the time difference $|\Delta t|$, the electromagnetic noise emitted from the switching controllers 2_1 and 2_2 may reach the point L simultaneously, causing the noise enhancement effect at the point L. In other words, the electromagnetic noise emitted from the switching controllers 2_1 and 2_2 may simultaneously reach the point L where the relationship d_1=d_2+c×$|\Delta t|$ is satisfied, and the noise enhancement effect may occur.

Therefore, even if a communication device or a broadcasting device is installed at such a point L, these devices may not be able to normally receive desired radio waves used for communication or broadcasting due to the above-described noise enhancement effect.

Therefore, the central control device 3 according to the present embodiment does not simply set the timing at which the electromagnetic noise is emitted from the plurality of switching controllers 2 to different timing, but defines the point at which the electromagnetic noise is to be suppressed as a target point, and controls the timing at which the electromagnetic noise is emitted from the plurality of switching controllers 2 such that the noise enhancement effect does not occur at the target point. As described in detail below, the central control device 3 sets the operation time point of each switching controller 2, based on the distance between each switching controller 2 and the target point, thereby suppressing the occurrence of the noise enhancement effect at the target point.

FIG. 7 is a diagram showing a detailed configuration of the central control device 3 according to the present embodiment. As shown in FIG. 7, the central control device 3 comprises a memory 8, a timing controller 9, and a transmitter/receiver 10. Incidentally, the switching controller 2 may further comprise a transmitter/receiver 7 for communicating with the central control device 3 in addition to the configuration shown in FIG. 2 and FIG. 3, as shown in FIG. 7.

The memory 8 stores information necessary to control operation time points of the plurality of switching controllers 2 that are control targets. More specifically, the memory 8 stores distance information concerning the distance between the switching controllers 2 which are the control targets, and distance information concerning the distance between each switching controller 2 and a target point. Incidentally, the memory 8 may store position information concerning positions of each switching controller 2 and the target point, in addition to or instead of the above-described distance information. In addition, the memory 8 may further store information concerning the frequency and the period of the carrier signal of each switching controller 2.

The timing controller 9 generates control parameters related to the timing at which the switching controllers 2 perform the switching operations, based on the various information stored in the memory 8. Incidentally, the timing controller 9 may also generate various instructions to start (start up) and stop (shut down) the switching controller 2, apart from generating the above-described control parameters. The generated control parameters and various instructions are transmitted (supplied) to the switching controllers 2 via the transmitter/receiver 10.

Figure 8:
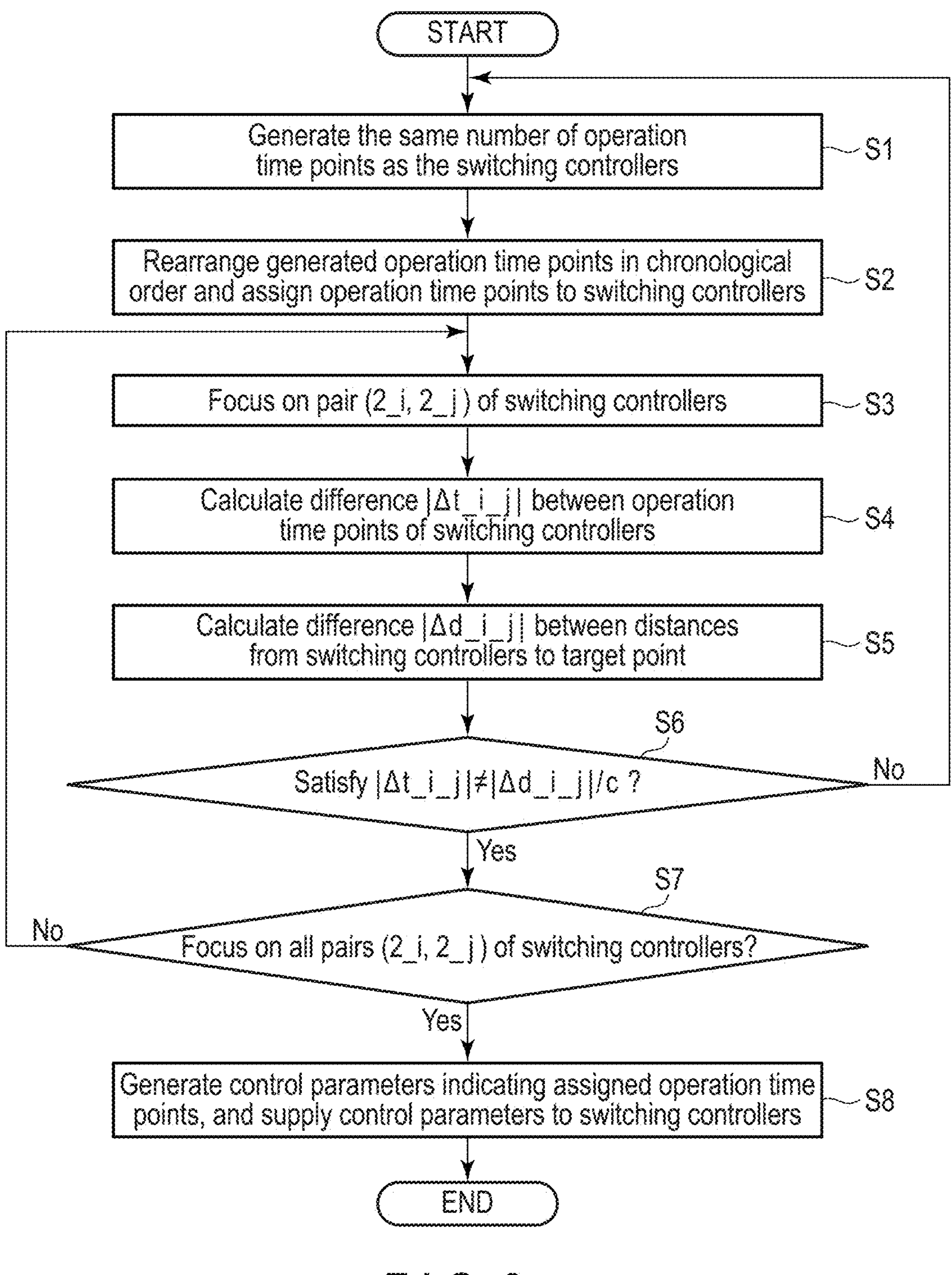
FIG. 8 is a flowchart showing an operation example of the central control device according to the embodiment.

FIG. 8 is a flowchart showing an operation example of the central control device 3 according to the present embodiment. Incidentally, a sequence of operations shown in FIG. 8 is performed, for example, before the plurality of switching controllers 2 that are the control targets start the operations.

First, the central control device 3 generates values of operation time points within the range which can be set for any of the plurality of switching controllers 2 that are the control targets, i.e., the same number of values of operation time points (hereinafter simply referred to as "operation time point/points") as the number of switching controllers 2 (step S1). Incidentally, in this case, the "operation time point" does not indicate the timing to turn on/off the switching controllers 2 itself, but indicates, for example, the timing when the phase of the carrier signals of the switching controllers 2 becomes zero.

Incidentally, for example, the central control device 3 randomly generates the same number of operation time points as the number of switching controllers 2, using a random number generator. In addition, as regards the time corresponding to the range in which the above-described operation time points of the plurality of switching controllers 2 can be set (settable range), for example, a value half of the cycle of the carrier signal used in a predetermined switching controller 2 of the plurality of switching controllers 2 that are control targets may be used as an upper limit.

Next, the central control device 3 rearranges the plurality of operation timing generated in the process of step S1 in chronological order and performs the process of assigning the plurality of operation time points to the plurality of switching controllers 2 that are control targets in order (step S2). In the following descriptions, it is assumed that the number of switching controllers 2 that are control targets is N (where N is an integer of two or more). In addition, it is assumed below that the number of target points, i.e., the points where the noise enhancement effect is to be suppressed is only one.

The central control device 3 focuses on a pair (2_i, 2_j) of switching controllers 2 to which operation time points t_i and t_j is assigned in the process of step S2 (step S3). Incidentally, i described above is an integer that satisfies a relationship $1 \le i \le N$. In addition, j described above is an integer that satisfies relationships $1 \le j \le N$ and $j \ne i$.

The central control device 3 calculates a difference $|\Delta t\_i\_j|$ between the operation time point t_i assigned to the switching controller 2_i and the operation time point assigned to the switching controller 2_j (step S4).

The central control device 3 calculates difference $|\Delta d\_i\_j|$ between distances d_i and d_j, based on the distance information indicating distance d_i from the switching controller 2_i to the target point and distance d_j from the switching controller 2_j to the target point, which are stored in the memory 8 (step S5).

After that, the central control device 3 confirms whether the difference in operation time point $|\Delta t\_i\_j|$ calculated in the processing of step S4, and the difference in distance $|\Delta d\_i\_j|$ calculated in the process of step S5, satisfy expression (1) shown below (step S6).

$$|\Delta t\_i\_j| \ne |\Delta d\_i\_j|/c \tag{1}$$

Incidentally, c shown above refers to the propagation speed of the electromagnetic noise, which is assumed to be a constant value in this case.

If it is confirmed in the process of step S6 that the above-mentioned expression (1) is not satisfied, i.e., if it is confirmed that the electromagnetic noise emitted from the focused pair (2_i, 2_j) of switching controllers 2 generates the noise enhancement effect at the target point (No in step S6), the above-described process of step S1 is performed again, and the same number of operation time points as the number of switching controllers 2 (i.e., N operation time points) are generated again.

In contrast, if it is confirmed in the process of step S6 that the above-mentioned expression (1) is satisfied, i.e., if it is confirmed that the electromagnetic noise emitted from the focused pair (2_i, 2_j) of switching controllers 2 does not generate the noise enhancement effect at the target point (Yes in step S6), the central control device 3 confirms whether the central control device 3 has focused on all possible pairs (2_i, 2_j) of switching controllers 2, as regards the pairs (2_i, 2_j) of switching controllers 2 (step S7).

If it is confirmed in the process of step S7 that a pair (2_i, 2_j) of switching controllers 2 that has not been focused on still exists (No in step S7), the above-described process of step S3 is performed again to focus on the pair (2_i, 2_j) of switching controllers 2 that has not been focused on yet.

In contrast, if it is confirmed in the process of step S7 that all the possible pairs (2_i, 2_j) of the switching controllers 2 have been focused on (Yes in step S7), the central control device 3 generates control parameters indicating the assigned operation time points for the respective switching controllers 2, supplies these to the switching controllers 2 (step S8), and ends the series of operations.

Incidentally, it is confirmed that the electromagnetic noise emitted from all the possible pairs (2_i, 2_j) of switching controllers 2 does not cause the noise enhancement effect to occur at the target point, in the above-described series of operations, but the embodiment is not limited to this and, for example, the electromagnetic noise emitted from a predetermined number of pairs (2_i, 2_j) of switching controllers 2 may allow the noise enhancement effect to occur at the target point. For example, the central control device 3 may allow the electromagnetic noise emitted from one pair of switching controllers 2 to cause occurrence of the noise enhancement effect at the target point and may not allow the electromagnetic noise emitted from two or more pairs of switching controllers 2 to cause occurrence of the noise enhancement effect at the target point. In other words, the central control device 3 may allow one pair (2_i, 2_j) of switching controllers 2 not to satisfy the above-mentioned expression (1), and may not allow two or more pairs (2_*i*, 2_*j*) of switching controllers 2 not to satisfy the above-mentioned expression (1).

In addition, in the above-described process of step S2, the operating time points may be assigned in the order of switching controllers 2 whose timing when the phase of the carrier signal becomes zero is earlier. More specifically, the earliest operation time point t_1 may be assigned to the switching controller 2 with the earliest timing when the phase of the carrier signal becomes zero, the second earliest operation time point t_2 may be assigned to the switching controller 2 with the second earliest timing when the phase of the carrier signal becomes zero, and the operation time points t_1, t_2, . . . may be assigned to the switching controllers 2 in this manner.

Furthermore, it is assumed as an example that the operation time points of the switching controllers 2 are randomly generated, but the embodiment is not limited to this and, for example, the central control device 3 may calculate the above-described difference in distance |Δd_i_j| for all of the plurality of switching controllers 2 that are the control targets, specify the maximum value |Δd_i_j_max| of the difference in distance, and generate and set the operation time point such that any difference |Δt_i_j_adj| between two consecutive operation time points is greater than |Δd_i_j_max|/c. According to this, the above-described processes of steps S3 to S7 can be simply performed or these processes can be omitted, thereby reducing the amount of processing in the central control device 3 and reducing the processing load on the central control device 3.

Incidentally, if the difference |Δt_i_j_adj| between two consecutive operation time points is set to be greater than |Δd_i_j_max|/c and if the difference |Δt_i_j_adj| becomes a great value, it is considered that a number of operation time points cannot be set within the settable range. In other words, the same number of operation time points as the number of switching controllers 2 that are the control targets cannot be set within the settable range. In this case, the central control device 3 may perform the above-described series of operations shown in FIG. 8 and set the operation time points of the switching controllers 2 that are the control targets. In other words, if the central control device 3 can set the operation time point such that any difference |Δt_i_j_adj| between two consecutive operation time points is larger than |Δd_i_j_max|/c, the central control device 3 may set the operation time points by this setting method. If the central control device 3 cannot set the operation time points by this setting method, the central control device 3 may set the operation time points by performing the series of operations shown in FIG. 8.

In addition, it is assumed that one target point exists but, if a plurality of target points exist, the above-described processes of steps S3 to S7 are performed for all the target points. Incidentally, if the operation time points are set such that any difference |Δt_i_j_adj| between two consecutive operation time points is greater than |Δd_i_j_max|/c, as described above, the central control device 3 may calculate the maximum value |Δd_i_j_max| of the above-described difference in distance, specify the largest value |Δd_i_j_MAX| among the maximum values of the differences in distance, and set the operation time points such that any difference |Δt_i_j_adj| between two consecutive operation time points is larger than |Δd_i_j_MAX|/c.

Figure 9:
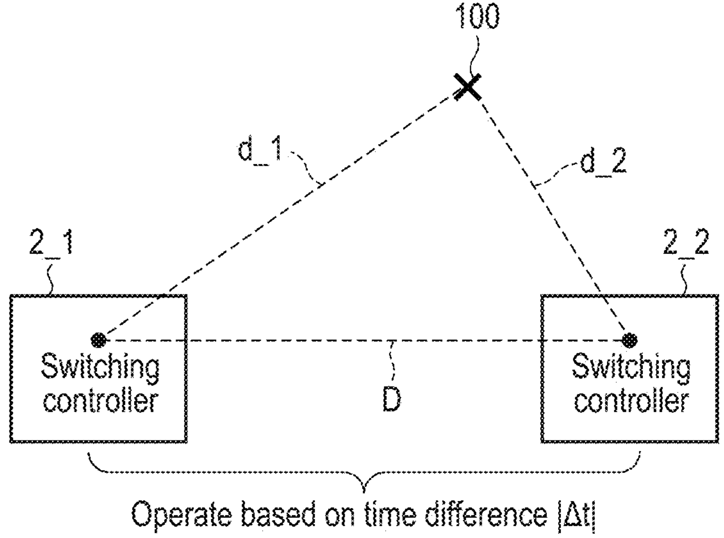
FIG. 9 is a chart illustrating control of the operation time point of the switching controller, which is performed by the central control device according to the embodiment.

A method of setting the operation time points of the plurality of switching controllers 2 that are the control targets, which is different from the above-described various methods, will be described with reference to FIG. 9. The central control device 3 may set the operation time points of the switching controllers 2_1 and 2_2 such that the difference |Δd| between the operation time points of the switching controllers 2_1 and 2_2 that are the control targets is larger than a value obtained by dividing a distance D between the switching controllers 2_1 and 2_2 by a propagation speed c of the electromagnetic noise, as shown in, for example, FIG. 9.

This setting method is a method using a fact that a point satisfying a relationship |Δd|>D does not theoretically exist, focusing on the difference |Δd| (=|d_1−d_2|) in distance from each of the switching controllers 2_1 and 2_2 to a target point 100, and the distance D between the switching controllers 2_1 and 2_2. In other words, the central control device 3 sets the operation time points of the switching controllers 2_1 and 2_2 such that the difference |Δt| between the operation time points of the switching controllers 2_1 and 2_2 satisfies the relationship c×|Δt|>D (in other words, |Δt|>D/c). The central control device 3 can therefore set the operation time points at which the noise enhancement effect does not occur no matter where the target point 100 is located.

Figure 10:
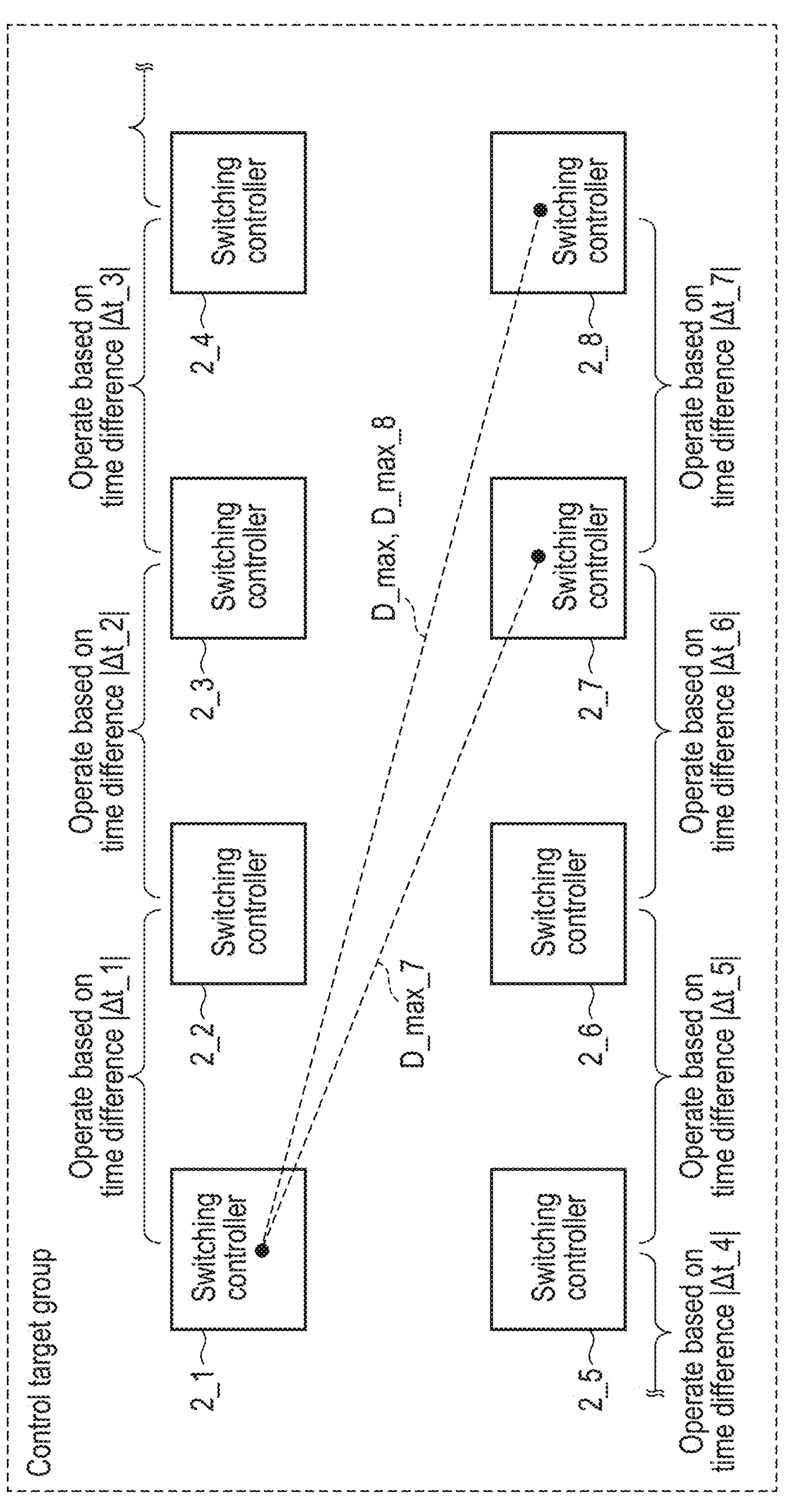
FIG. 10 is a chart illustrating control of the operation time point of the switching controller, which is performed by the central control device according to the embodiment.

Incidentally, when the number of switching controllers 2 that are the control targets is three or more, for example, eight as shown in FIG. 10, the central control device 3 sets the operation time points of the respective switching controllers 2_1 to 2_8 such that each of differences |Δt_1| to |Δt_7| between the two consecutive operation time points is larger than a value obtained by dividing distance D_max between two switching controllers 2_1 and 2_8 that are located farthest from each other by the propagation speed c of the electromagnetic noise.

A method of setting the operation time points of the plurality of switching controllers 2 that are the control targets, which is different from the above-described various methods, will be further described with reference to FIG. 10. The central control device 3 may calculate the distance from each switching controller 2 that is the control target to the other switching controller 2 located farthest and set the operation time points of the two switching controllers 2 such that the difference between the operation time points of the two switching controllers 2 is greater than the value obtained by dividing the calculated distance by the propagation speed c of the electromagnetic noise.

For example, setting the operation time point of the switching controller 2_8 shown in FIG. 10 is assumed. In this case, the central control device 3 calculates a distance D_max 8 from the switching controller 2_8 to the switching controller 2_1, which is located farthest, and sets the operation time points of the switching controllers 2_1 and 2_8 such that difference |Δt_1_8| between the operation time points of the switching controllers 2_1 and 2_8 satisfies a relationship D_max 8/*c*.

Similarly, when setting the operation time point of the switching controller 2_7 shown in FIG. 10, the central control device 3 In this case, the central control device 3 calculates a distance D_max 7 from the switching controller 2_7 to the switching controller 2_1, which is located farthest, and sets the operation time points of the switching controllers 2_1 and 2_7 such that difference |Δt_1_7| between the operation time points of the switching controllers 2_1 and 2_7 satisfies a relationship D_max 7/*c*.

Incidentally, as shown in FIG. 10, the distance D_max 7 between the switching controllers 2_1 and 2_7 is smaller than the distance D_max 8 between the switching controllers 2_1 and 2_8. For this reason, similarly to the switching controller 2_7, the difference in operation time point for the switching controller 2_7 located near the center of the control target group including a plurality of switching controllers 2 that are the control targets, tends to be smaller than the difference in operation time point for the switching controllers 2 located near the periphery of the control target group. In other words, this setting method is useful in a case where, for example, when the differences $|\Delta t\_1|$ to $|\Delta t\_7|$ between two consecutive operation time points are set to be larger than D_max/c, the differences $|\Delta t\_1|$ to $|\Delta t\_7|$ become large values and the same number of operation time points as the number of switching controllers 2 which are the control targets cannot be set within the settable range.

In addition, as a simple method, the central control device 3 may set the operation time point of each switching controller 2 to be shifted by the time equivalent to the value obtained by dividing the time corresponding to the above-described settable range by the number of switching controllers 2 that are the control targets.

The above-described setting of the operation time point of each switching controller 2 that is the control target may be performed, for example, only for the switching controller 2 which satisfies the predetermined conditions among the plurality of switching controllers 2 that are the control targets. In one example, the operation time point may be set only for the switching controller 2 whose carrier signal frequency (carrier frequency) shows the same value among the plurality of switching controllers 2 that are the control targets.

For example, when the switching controllers 2_1, 2_3, 2_5, and 2_7 shown in FIG. 10 operate at carrier frequency f_1 and the switching controllers 2_2, 2_4, 2_6, and 2_8 operate at carrier frequency f_2, which is different from the carrier frequency f_1, the central control device 3 sets the operation time points for the switching controllers 2_1, 2_3, 2_5, and 2_7 operating at the carrier frequency f_1 by performing one of the above-described setting methods, while the central control device 3 sets the operation time points for the switching controllers 2_2, 2_4, 2_6, and 2_8 operating at the carrier frequency f_2 by performing one of the above-described setting methods. 8.

Alternatively, as another example, the operation time point may be set only for the switching controllers 2 in which a distance between the controllers is within a predetermined distance, among the plurality of switching controllers 2 that are the control targets. The above-mentioned predetermined distance is set to, for example, a distance at which the intensity of the electromagnetic noise emitted from the switching controller 2 falls below a predetermined level due to distance attenuation.

For example, when the distance between the switching controllers 2_1 and 2_8 shown in FIG. 10 indicates a value greater than the above-mentioned predetermined distance and when each distance between the switching controllers 2_1 to 2_7 is within the above-mentioned predetermined distance, the central control device 3 performs one of the various setting methods described above, for the switching controllers 2_1 to 2_7 and sets the operation time points of these switching controllers 2.

As an example, it has been assumed that the above-mentioned predetermined distance is set to a distance where the intensity of the electromagnetic noise is under a predetermined level. The predetermined distance is not limited to this, but may be set to a distance where the intensity is under a predetermined level even if the noise enhancement effect caused by the two switching controllers occurs. In this case, the above-mentioned predetermined distance may be set to a distance that can tolerate the electromagnetic noise equivalent to "4 $(=(1\times 2)^2)$", assuming that the value of the electromagnetic noise emitted from one switching controller 2 is "1". According to this, a large number of operation time points can be set within a settable range by setting the operation time points for a small number of switching controllers 2 even if the settable range is finite.

Incidentally, the central control device 3 may perform the series of operations shown in FIG. 8 at each preset time interval and perform one of the various setting methods described above to update the control parameter supplied to each switching controller 2. According to this, it is also possible to respond to the change in the operation status and the operation environment of the switching controller 2, for example, the occurrence of a drift in which the frequency of the carrier signal of the switching controller 2 varies due to changes in temperature or other factors.

The switching system 1 of the first embodiment described above comprises the central control device 3 that controls the operation time point of each switching controller 2, based on the distance between each switching controller 2 that is the contrast target and the target point 100. According to this, it is possible to suppress the occurrence of the noise enhancement effect at the target point 100.

Second Embodiment

Figure 11:
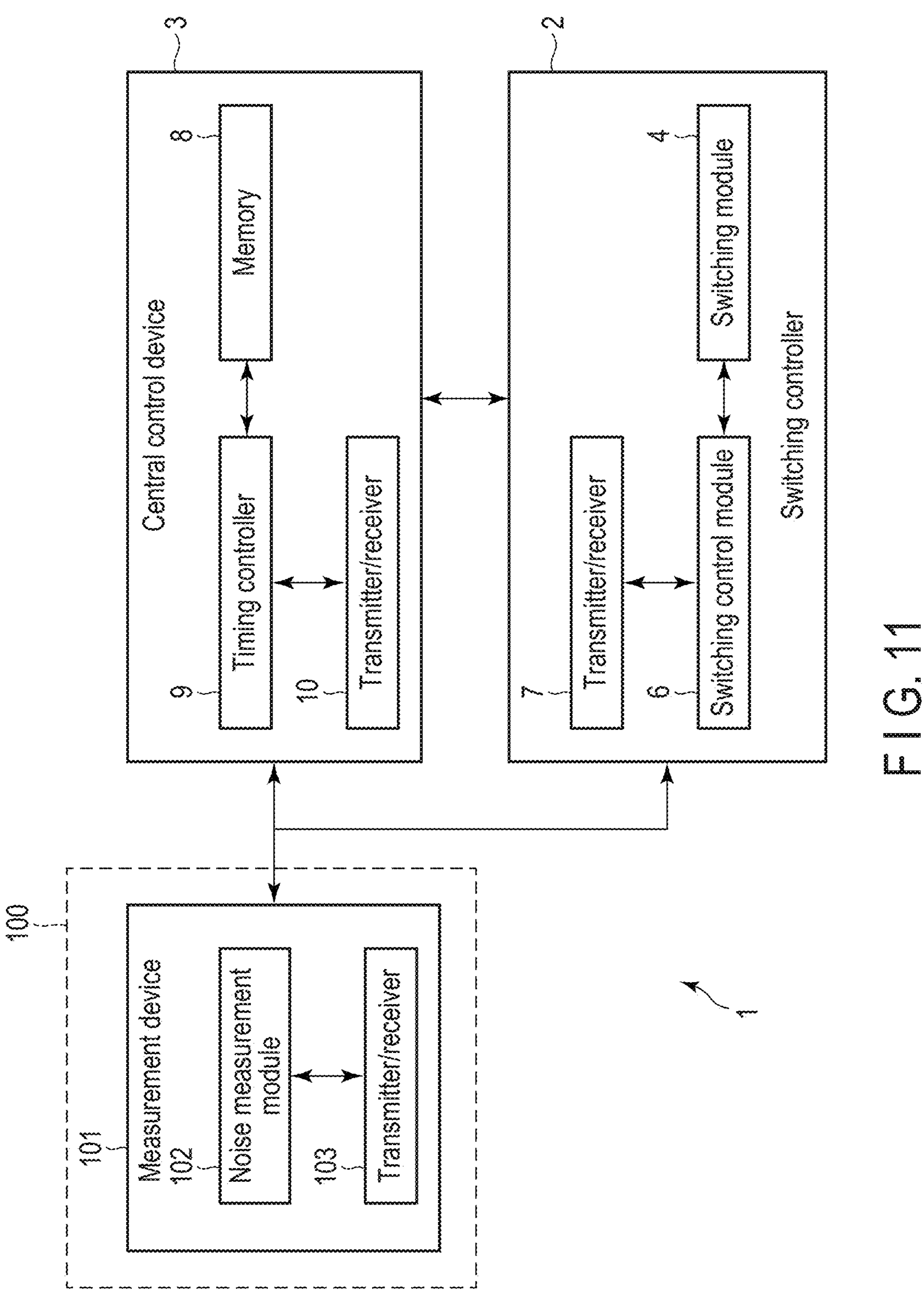
FIG. 11 is a diagram showing a schematic configuration example of a switching system according to a second embodiment.

Next, a second embodiment will be described. As shown in FIG. 11, the switching system 1 according to the second embodiment is different from the above-described configuration of the first embodiment in that a measurement device 101 is provided at a target point 100, i.e., the point where the electromagnetic noise is to be suppressed.

As will be described in detail below, the central control device 3 according to the present embodiment is different from the above-described configuration of the first embodiment in that by providing the measurement device 101 at the target point 100, the distance information on the distance between the switching control devices 2 which are the control targets and the distance information on the distance between each switching control device 2 which is the control target and the target point 100 do not need to be stored in the memory 8. Differences from the above-described first embodiment will be mainly described below, and the same points as the first embodiment will be omitted.

FIG. 11 is a diagram showing a detailed configuration of the measurement device 101 according to the present embodiment. As shown in FIG. 11, the measurement device 101 comprises a noise measurement module 102 and a transmitter/receiver 103.

The transmitter/receiver 103 communicates with the switching controller 2 and the central control device 3, for example, to receive instructions on the start and end of the electromagnetic noise measurement from the central control device 3 and to transmit the results of the electromagnetic noise measurement to the central control device 3.

As described above, the central control device 3 according to the present embodiment transmits a measurement start instruction to instruct the start of the electromagnetic noise measurement, and a measurement end instruction to instruct the end of the electromagnetic noise measurement to the measurement device 101 via the transmitter/receiver 10. In addition, the central control device 3 according to the present embodiment transmits an operation start instruction to perform a switching operation (i.e., an operation start instruction to instruct the start of electromagnetic noise emission) to one of the switching controllers 2 which are the control targets, at the timing of transmitting the above-described measurement start instructions to the measurement device 101. Furthermore, the central control device 3 according to the present embodiment transmits the operation end instruction to end the switching operation (in other words, the operation end instruction to instruct the end of electromagnetic noise emission) to the switching controller 2 which is operating in accordance with the above-described operation start instruction, at the timing of transmitting the above-described measurement end instruction to the measurement device 101.

The noise measurement module 102 is configured to include, for example, an antenna and measures the electromagnetic noise emitted from each switching controller 2. More precisely, the noise measurement module 102 measures the time which elapses after receiving the measurement start instruction transmitted from the central control device 3 (i.e., after a predetermined switching controller 2 emits the electromagnetic noise in accordance with the above-described operation start instruction) until receiving the electromagnetic noise. In other words, the noise measurement module 102 measures the time until the electromagnetic noise emitted from the predetermined switching controller 2 reaches the target point 100 (hereinafter referred to as an arrival time).

When measuring the above-described arrival time, the noise measurement module 102 calculates the distance between the predetermined switching controller 2 and the target point 100, based on the arrival time and the propagation speed c (constant value) of the electromagnetic noise. The distance information indicating the calculated distance is transmitted to the central control device 3 via the transmitter/receiver 103, as a noise measurement result.

According to this, the central control device 3 can obtain (receive) the distance information on the distance between each switching controller 2 which is the control target and the target point 100, from the measurement device 101 provided at the target point 100, and the distance information does not need to be stored in the memory 8 in advance. Thus, obtaining the distance information from the measuring device 101 provided at the target point 100 is useful especially when the target point 100 (communication device or broadcasting device) moves. For example, if the target point 100 is always located at the same place, the central control device 3 need only to store the distance information on the distance between the switching controller 2 and the target point 100, in the memory 8, in advance. However, if the target point 100 moves, the central control device 3 cannot store the distance information on the distance in the memory 8 since the distance between the switching controller 2 and the target point 100 changes. The central control device 3 according to the present embodiment can respond to such a case.

Figure 12:
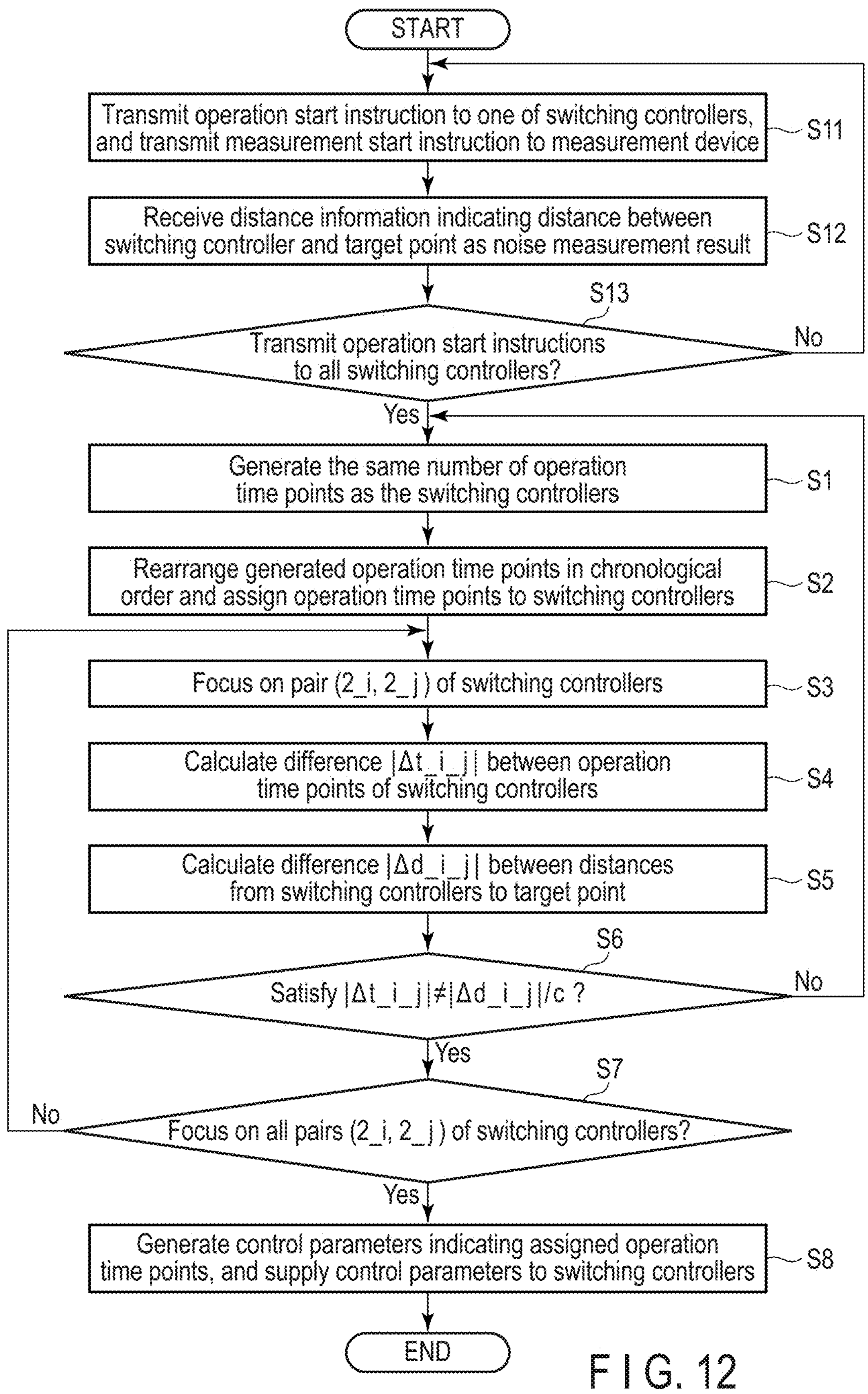
FIG. 12 is a flowchart showing an operation example of the central control device according to the embodiment.

FIG. 12 is a flowchart showing an operation example of the central control device 3 according to the present embodiment. Incidentally, a sequence of operations shown in FIG. 12 is performed, for example, before the plurality of switching controllers 2 that are the control targets start the operations. In addition, in the following descriptions, it is assumed that the number of switching controllers 2 that are control targets is N (where N is an integer of two or more) and that only one target point 100 exists.

First, the central control device 3 transmits the operation start instruction to instruct the start of the electromagnetic noise emission to one of the plurality of switching controllers 2 that are the control targets, and transmits the measurement start instruction to start the electromagnetic noise measurement to the measurement device 101 provided at the target point 100 where the electromagnetic noise is to be suppressed (step S11).

Next, the central control device 3 receives the distance information indicating the distance between the switching controller 2 and the target point 100 as the noise measurement result from the switching controller 2 which operates according to the operation start instruction transmitted in the process of step S11 (step S12). The received distance information may be temporarily stored in, for example, the memory 8.

The central control device 3 confirms whether the central control device 3 has transmitted the operation start instructions to all of the plurality of switching controllers 2 that are the control targets (step S13).

If it is confirmed in the process of step S13 that the switching controller 2 to which the operation start instruction has not yet been transmitted exists (No in step S13), the above-described process of step S11 is performed again, and a process to transmit the operation start instruction to the switching controller 2 to which the operation start instruction has not yet been transmitted is performed.

In contrast, if it is confirmed in the process of step S13 that the operation start instructions have been transmitted to all the switching controllers 2 that are the control targets (Yes in step S13), the central control device 3 performs the processes of steps S1 to S8 shown in FIG. 8 in order, sets the operation time point of each of the switching controllers 2, and ends the series of operations.

Incidentally, the distance information temporarily stored in memory 8 may be deleted in the memory 8 when the series of operations is ended.

In addition, it has been described that the operation time points of the plurality of switching controllers 2 that are the control targets are set by performing the processes of steps S1 to S8 shown in FIG. 8. The embodiment is not limited to this, but the operation time point of each switching controller 2 may be set by performing any one of the various setting methods of the above-described first embodiment.

Incidentally, the central control device 3 may perform, for example, the series of operations shown in FIG. 12 at each preset time interval to update the control parameters supplied to each switching controller 2.

In addition, it has been assumed that only one target point 100 exists, i.e., only one measurement device 101 exists. However, if a plurality of target points 100 exist, the central control device 3 transmits the measurement start instructions to all the measurement devices 101 in the above-described process of step S11. As described above, the central control device 3 transmits the operation start instruction to one of the plurality of switching controllers 2 that are the control targets, in order, and while the switching controller 2 is operating, controls the operations of the plurality of switching controllers 2 such that the other switching controllers 2 do not operate. According to this, the central control device 3 can obtain the distance information on the distance between the switching controller 2 which operates according to the operation start instruction and the target point 100 at which the own device is provided, from each measurement device 101. In addition, when three or more target points 100 are provided, for example, the central control device 3 can also estimate the position of the switching controller 2 which is operating according to the operation start instruction, based on the intensity of the electromagnetic noise measured by the measurement device 101 provided at each target point 100.

The switching system 1 according to the above-described second embodiment further comprises the measurement device 101 which is provided at the target point 100 where the electromagnetic noise is to be suppressed and which transmits the distance information on the distance between each switching controller 2 and the target point 100. According to this, the central control device 3 does not need to store the distance information on the distance between each switching control device 2 which is the control target and the target point 100 in the memory 8 in advance, and can respond to, for example, a case where the target point 100 moves.

According to at least one embodiment described above, the control device, the system and the storage medium capable of suppressing observation of the increase in electromagnetic noise generated due to the switching operation can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device connected to a first switching controller and a second switching controller converting AC signals into DC signals and outputting the DC signals or converting DC signals into AC signals and outputting the AC signals, the control device comprising:

a transmitter/receiver configured to communicate with the first switching controller and the second switching controller; and a timing controller configured to control operation time points of the first switching controller and the second switching controller, based on a first distance corresponding to a distance between a target point corresponding to a point where electromagnetic noise emitted from the first switching controller and the second switching controller is suppressed and the first switching controller, and a second distance corresponding to a distance between the target point and the second switching controller.

2. The control device of claim 1, wherein the timing controller is configured to control the operation time point of the first switching controller and the operation time point of the second switching controller to be shifted from each other.

3. The control device of claim 2, wherein the timing controller is configured to control the operation time point of the first switching controller and the operation time point of the second switching controller to be shifted by time corresponding to a value obtained by dividing time corresponding to a range in which the operation time points of the first switching controller and the second switching controller are settable by the number of the first switching controller and the second switching controller.

4. The control device of claim 3, wherein the time corresponding to the range in which the operation time points of the first switching controller and the second switching controller are settable corresponds to a value half of a cycle of a carrier signal of the first switching controller or the second switching controller.

5. The control device of claim 1, wherein the timing controller is configured to control the operation time points of the first switching controller and the second switching controller, based on a difference between the first distance and the second distance.

6. The control device of claim 5, wherein the timing controller is configured to control the operation time points of the first switching controller and the second switching controller, based further on a distance between the first switching controller and the second switching controller.

7. The control device of claim 1, wherein the timing controller is configured to control the operation time points of the first switching controller and the second switching controller, when the first switching controller and the second switching controller perform switching operations based on carrier signals of a same frequency.

8. The control device of claim 1, wherein the timing controller is configured to control the operation time points of the first switching controller and the second switching controller when the second switching controller exists within a distance in which an intensity of electromagnetic noise emitted from the first switching controller becomes below a predetermined level.

9. The control device of claim 1, wherein the timing controller is configured to control the operation time points of the first switching controller and the second switching controller, at each present time interval.

10. The control device of claim 1, wherein the transmitter/receiver is configured to further communicate with a measurement device installed at the target point to measure electromagnetic noise, and receive distance information on the first distance and distance information on the second distance as results of measurement of the measurement device.

11. A system comprising:

a first switching controller and a second switching controller converting AC signals into DC signals and outputting the DC signals or converting DC signals into AC signals and outputting the AC signals; and a control device connected to the first switching controller and the second switching controller, wherein the control device comprises:

a transmitter/receiver configured to communicate with the first switching controller and the second switching controller; and a timing controller configured to control operation time points of the first switching controller and the second switching controller, based on a first distance corresponding to a distance between a target point corresponding to a point where electromagnetic noise emitted from the first switching controller and the second switching controller is suppressed and the first switching controller, and a second distance corresponding to a distance between the target point and the second switching controller.

12. A non-transitory computer-readable storage medium storing instructions executed by a computer of a control device connected to a first switching controller and a second switching controller converting AC signals into DC signals and outputting the DC signals or converting DC signals into AC signals and outputting the AC signals, wherein the instructions, when executed by the computer, cause the computer to perform:

communicating with the first switching controller and the second switching controller; and controlling operation time points of the first switching controller and the second switching controller, based on a first distance corresponding to a distance between a target point corresponding to a point where electromagnetic noise emitted from the first switching controller and the second switching controller is suppressed and the first switching controller, and a second distance corresponding to a distance between the target point and the second switching controller.

* * * * *